Oct. 18, 1927.

J. O. KLEBER 1,646,152

RADIO CIRCUIT TESTING INSTRUMENT

Filed May 20, 1926

INVENTOR
Jackson O. Kleber
by Ralph Donath
Paul Purchard
Attorneys.

Patented Oct. 18, 1927.

1,646,152

UNITED STATES PATENT OFFICE.

JACKSON O. KLEBER, OF PITTSBURGH, PENNSYLVANIA.

RADIO-CIRCUIT-TESTING INSTRUMENT.

Application filed May 20, 1926. Serial No. 110,438.

This invention relates to electrical testing apparatuses and more in particular to apparatuses for testing radio receiving sets and loud speakers.

The primary object of this invention is to provide an apparatus for testing radio receiving apparatuses using electron-tubes with great rapidity by persons having only a very limited experience in the art of radiography. Another object is to provide a testing apparatus of this character whereby defects in the electrical connections may be quickly located. A further object is to provide a testing apparatus which is simple in construction and which, therefore, can be manufactured at relatively low cost. Additional features and advantages of this invention will appear from the following description considered in connection with the accompanying drawing forming part of this application and in which:—

Fig. 1 is a front elevation of the box-portion of a testing apparatus designed for testing a well known make of radio receiving instrument operating, in the present example, with six electron-tubes, all standard parts of this receiving apparatus being shown in dot and dash lines.

Fig. 2 is the comb-like contact portion of the testing apparatus.

Fig. 3 is a top plan view, partly broken away, of the box-portion.

Fig. 4 shows the relative position of the comb-like contact-portion when applied to the radio receiving apparatus, shown in dot and dash lines.

Fig. 5 shows the holding-clamp used for attaching the contact-portion to the radio receiver.

Fig. 6 is a cross-section through the box-portion of the testing apparatus, taken on line 6—6, Figs. 1 and 3.

Fig. 7 is a fractional bottom view of the box-portion.

Fig. 8 is a diagram showing some of the wiring connections in the box-portion.

Fig. 9 is a top-view of the six-tube radio-receiver shown in Fig. 1.

Reference being had to the drawing which shows the application of this invention to a six-tube radio-receiving instrument "A" of a well known make, it will be noted that the testing apparatus comprises two principal parts, namely the box-portion "B" and the comb-like contact-portion "C".

The box-portion consists of a rectangular box 1 having a cover 2 upon which are placed two parallel rows 3 and 4 of oppositely disposed contact points 5 and 6. The former are numbered consecutively to indicate the numeral of the test whereas the other contact points are annotated to indicate the various voltages which should be obtained at each test. These voltages are read on a voltmeter 7 deriving its current from an electrical battery 8, both elements being connected by means of the terminal posts 9 and the wires 10 to the parallel metal slide-bars 11 and 12 which are placed on the cover 1 and carried by the insulated supports 13. These bars serve as guides for a contact-slide 14 made of insulating material and having at its under-side two separate contact blades 15 and 16 adapted to engage respectively the contact points in the rows 3 and 4.

Mounted on the underside of the box-member 1 is a strip 17 of insulating material upon which are properly located the gang-plugs 18, (six in the present embodiment) having the four contact-pins 19 of proper size and disposition to fit within the sockets 20 in which the six electron-tubes of the receiving instrument are normally mounted. These contact pins are properly connected, (to suit the wiring diagram of the receiving instrument) by means of wires placed within the box 1 to the inwardly protruding ends 21 of the contact-points 5 and 6.

The contact-portion "C" consists of a strip of insulating material upon which are secured the substantially L-shaped and resilient contact fingers 23, equal in number and spacing to that of the terminals 24 forming part of the radio receiving instrument A. These various contact fingers are also connected by means of wires 25 of suitable length and the connectors 26 to the proper contact-points 5 and 6. For ease of handling, these numerous wires are preferably bunched together to form a single cable indicated by the numeral 27 in various figures.

To establish the required testing circuits, the various contact-fingers 23 must be brought simultaneously in proper engagement with their corresponding terminals 24. To that effect, there are secured at both ends of the strip 22 the hangers 28 which are suitably bent to produce a bight 29 adapted to fit about the terminal strip 30 of the receiving instrument. The desired contact pressure of the fingers 23 on the terminals 24 is obtained by means of screws 31 provided in the bridge-portion of the hangers.

In order to test a radio-receiving instrument by means of this testing apparatus, the electron-tubes of said instrument are first removed and the gang-plugs of the box-portion are inserted in their stead; the comblike contact-member C is then mounted on the terminal-strip 30 to press the contact-fingers 23 on the terminals 24, and the voltmeter 7 with its battery 8 are now connected to the terminal posts 9. The various connections in the radio-receiving instrument may now be tested by passing the contact-slide successively over the various contact-points in the two rows 3 and 4. As stated before, the voltage to be expected for each circuit in the receiving instrument is indicated at the side of each contact point of row 4. In order to inform the instrument tester of the meaning of the various circuit numerals, a test-table 32 having the required information is placed on one side of the box-portion. Thus for instance, when the contact-slide is on the first set of contact-points, the connections to the rheostat of the radio-receiver can be tested as to their voltage and condition. If no voltage is indicated on the voltmeter 7, it means that said connection is broken or loosened. Similarly if no voltage is read on the voltmeter when the contact slide is on the second set of contact points, it indicates that the battery switch contact is loose or defective and that, therefore, the trouble should be looked for at this place, and so forth.

It will be appreciated that by means of this testing apparatus all connections of a receiving instrument can be tested in only a small fraction of the time now required for doing this work by the old method which requires dismounting part of the receiving instrument and tracing each circuit wire for wire.

Since the main object of testing a receiving apparatus is to ascertain whether or not all the wire connections are perfect, the knowledge of the voltage at each connection is not absolutely necessary and, therefore, the voltmeter may be replaced by a less fragile and cheaper device such as an electric bell or buzzer. The sounding of said device will then indicate that the tested connection is satisfactory and the absence of sound will denote a broken connection.

The construction of the testing apparatus is, of course, modified to suit the type of receiving instrument and the number of electron-tubes used therewith. Thus a four-tube receiving set would have four gang-plugs 18 and the proper number of contact-points 5, 6 and of contact-fingers 23.

This testing apparatus is especially intended for manufacturers, wholesalers and retailers, who must test each apparatus before it is sold to the public. In view of the limited number and sizes and types of standard receiving instruments handled by each distributor, the latter would only be required to provide himself with but a few testing apparatuses for testing purposes.

While I have illustrated and described herein the preferred embodiment of my invention, and one which I have found by actual use to be very practical, it may be thought desirable after continued experience to make slight changes in the construction and arrangement of the details of my invention, and I intend to include in this application all such variations as fall within the scope of the appended claims.

I claim:

1. In a testing apparatus for radio-receiving instruments of the character described, a box portion having a plurality of gang-plugs adapted to fit the sockets of the electron-tubes of said instrument; a contact-strip having a plurality of contact-fingers adapted to engage simultaneously an equal number of terminals of said instrument, a plurality of contact points positioned on said box portion; a sliding contact-member adapted to slide over said contact-points and engage two thereof simultaneously; metallic slide bars for guiding said sliding contact member; electrical connections for connecting into definite circuits said gang-plugs, contact-fingers and terminals to said contact points, and means for sending a test current through any circuit defined by a pair of contact points engaged by said sliding-contact-member.

2. In a testing apparatus for radio-receiving instruments of the character described, a box portion having a plurality of gang-plugs adapted to fit the sockets of the electron-tubes of said instrument; a contact-strip having a plurality of contact-fingers adapted to engage simultaneously an equal number of terminals of said instrument, means for fastening said contact-strip to the terminal-strip of said instrument, a plurality of contact points positioned on said box-portion; a sliding contact-member adapted to slide over said contact-points and engage two thereof simultaneously; metallic slide-bars for guiding said sliding contact-member; electrical connections for connecting into definite circuits said gang-plugs, contact-fingers and terminals to said contact points, means for sending a test current through any circuit defined by a pair of contact-points engaged by said sliding-contact-member and adjustable means for pressing said contact-fingers against said terminals.

3. In a testing apparatus for radio-receiving instruments of the character described; a box-portion having a plurality of gang-plugs adapted to fit the sockets of the electron-tubes of the instrument to be tested; a contact-strip having a plurality of contact-fingers adapted to engage simultaneously the terminals of said instrument; a plurality of contact-points positioned on said box-portion; electric connections for connecting into definite circuits said gang-plugs; contact-fingers and terminals to said contact-points; a source of electrical energy; means cooperating with said contact-points for closing any selected circuit, and means for sending a test-current from said source of electrical energy into said circuit.

4. In a testing apparatus for radio receiving instruments of the character described, a box portion; a plurality of gang-plugs adapted to fit the sockets of the electron-tubes of the instrument to be tested; a plurality of contact-points positioned on said box-portion; electric connections for connecting into definite circuits said gang-plugs and contact-points; a source of electrical energy; means cooperating with said contact-points for closing any selected circuit, and means for sending a test current from said source of electrical energy into said circuit.

In testimony whereof I affix my signature.

JACKSON O. KLEBER.